United States Patent [19]

Colvin

[11] 3,754,688
[45] Aug. 28, 1973

[54] SOLIDS METERING DEVICE

[76] Inventor: Richard R. Colvin, 140 W. 57th St., New York, N.Y. 10019

[22] Filed: Mar. 6, 1972

[21] Appl. No.: 232,092

[52] U.S. Cl. .............................................. 222/362
[51] Int. Cl. .......................................... G01f 11/24
[58] Field of Search.................. 222/494, 370, 367, 222/362, 363, 366, 444, 359, 355; 221/269, 248, 265, 250; 251/303

[56] References Cited
UNITED STATES PATENTS

| 3,249,266 | 5/1966 | Cole et al. ..................... 222/370 X |
| 895,516 | 8/1908 | Tucker................................ 222/354 |
| 1,931,908 | 10/1933 | Tillotson......................... 222/355 X |
| 3,129,853 | 4/1964 | Hoskins ......................... 222/362 X |
| 3,347,425 | 10/1967 | Beushausen et al. ........... 221/264 X |
| 2,837,252 | 6/1958 | Hoynak, Jr. .................... 222/494 X |

Primary Examiner—Samuel F. Coleman
Assistant Examiner—Norman L. Stack, Jr.
Attorney—Dean S. Edmonds, Frank F. Scheck and Harry C. Jones III et al.

[57] ABSTRACT

There is disclosed a dispenser for instant coffee and other granular materials, suitable for attachment to jars of such materials as a replacement for conventional jar caps, said dispenser having means for receiving a predetermined quantity of material from the interior of the container for dispensing the predetermined amount.

4 Claims, 6 Drawing Figures

Patented Aug. 28, 1973  3,754,688
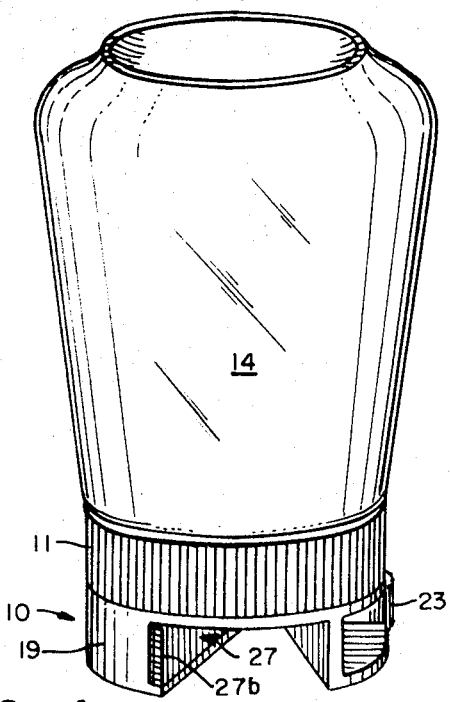
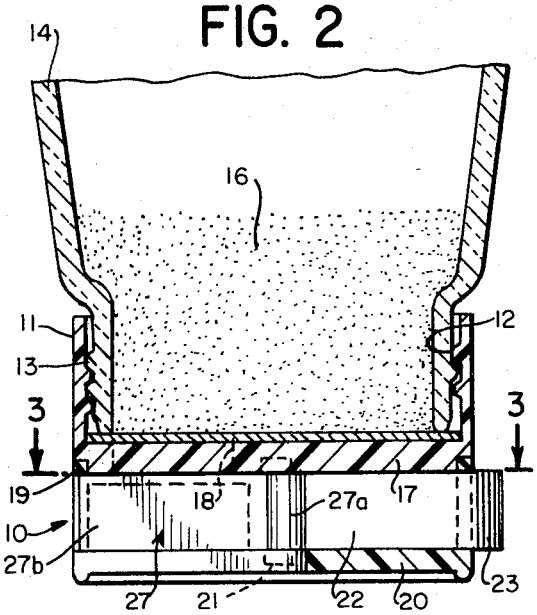
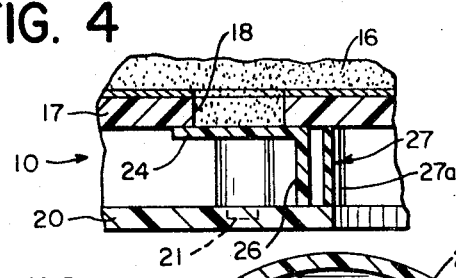
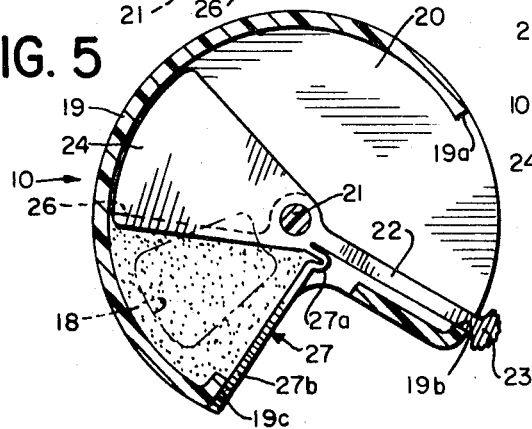
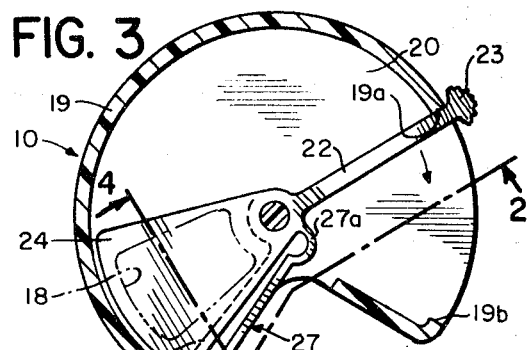
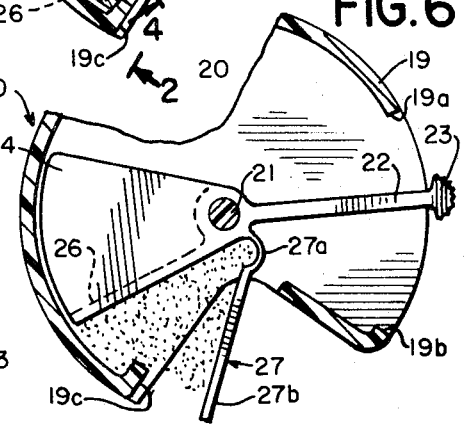

3,754,688

SOLIDS METERING DEVICE

BACKGROUND OF THE INVENTION

The present invention is directed to dispensing granular or powdered material in metered quantities and is particularly useful for dispensing accurately a material such as instant coffee. Such coffees, whether they be in the conventional or freeze-dried forms, present the difficulty that since they are highly concentrated, small changes in the amount used to brew a cup of coffee can considerably affect the flavor. Manufacturers of instant coffee would prefer that the user measure specific amounts consistently in order to achieve a particular and desirable strength. However, users seldom are as careful as the manufacturer would like, and consequently, coffee is brewed which varies considerably from cup to cup and which frequently has the effect of causing a user to be dissatisfied with the brand which he has chosen.

It is the purpose of the present invention to provide a dispenser or a dispensing device particularly useful for accurately measuring and releasing discrete quantities of instant coffee or other particulate solids material from a jar to which the dispenser is attached.

SUMMARY OF THE INVENTION

In accordance with the present invention, a solids metering device for receiving and discharging discrete solids material such as instant coffee and the like as a replacement for the closure cap of a jar or similar container filled with said solids is provided, the device comprising a hollow, cylindrical body having one end threaded for connection to the mouth of a standard-sized jar or container, spaced, transverse partitions connected thereto which mount therebetween a dispensing lever for rotary movement generally about the axis of said body, the partition nearest to said threaded end defining an opening in communication with the interior of said jar, a cover blade rigidly connected to said dispensing lever for sealing against said opening in one position of said lever, a compartmenting wall connected to said cover blade perpendicularly at one edge thereof, said wall being rigidly attached to said dispensing lever, and being together with said cover blade in sealing relation to said partitions, a flat discharge releasing finger resiliently mounted to said dispensing lever for movement with respect to said lever and the compartmenting wall, said finger being adapted to seal against edge portions of a discharge opening between said partitions, said cylindrical body including means for stopping the resilient discharge finger and including means for limiting rotary movement of said lever between positions wherein said blade cover seals said opening communicating with the interior of said jar and uncovering positions of said opening, whereby said lever may be rotated to uncover said opening so that solids material can fill a compartment defined between said transverse partitions, the compartmenting wall and said finger, return resilient movement of said finger when said dispensing lever is released causing automatic discharge of said compartment through the discharge opening.

BRIEF DESCRIPTION OF THE DRAWING

FIG. 1 is a front elevation in perspective of a dispensing device in accordance with the present invention connected to a jar containing granular or powdered material;

FIG. 2 is a vertical cross section of the device shown in FIG. 1;

FIG. 3 is a transverse cross section taken in the direction of arrows 3—3 of FIG. 2;

FIG. 4 is a vertical section taken in the direction of arrows 4—4 of FIG. 3; and FIGS. 5 and 6 are views similar to that of FIG. 3 showing the portions of the dispensing device respectively in the fully loaded and discharged positions.

DESCRIPTION OF A PREFERRED EMBODIMENT

Referring to the drawing, a solids metering device in accordance with the principles of the present invention in the form of a coffee dispenser 10 has been illustrated. The dispenser 10 consists of a cylindrical body 11 having internal threads 12 of a diameter which permits attachment to the threaded end 13 of a conventional jar 14 containing a quantity of granular or powdered instant coffee 16. It will be understood that jars 14 are commonly manufactured to have interchangeable caps and that, therefore, the dispenser 10 will fit jars of a variety of different brands. It will be further understood that the dispenser 10 may be manufactured of a suitable plastic material such as molded polypropylene.

Referring to FIGS. 2 and 4, the dispenser 10 includes a transverse partition 17 having an opening 18 therein which communicates with the interior of the jar 14. A generally cylindrical outer housing 19 extends from the partition 17 essentially coincident with cylindrical body 11 as a continuation thereof. A second transverse partition 20 is connected to the cylindrical housing 19. Between the partition 17 and 20 extends a pin 21 mounted for rotation therein. Connected to the pin 20 and rotatable therewith is a dispensing lever 22 having an outer portion 23 for manual engagement by the user extending radially beyond the periphery of housing 19. Integrally and rigidly connected to the dispensing lever 22 is a cover blade 24 which in the position of FIG. 3 seals the opening 18 in partition 17. A compartmenting wall 26 perpendicular to the cover blade 24 is integrally attached to the cover blade along one edge thereof. The compartmenting wall 26 extends in an axial direction between transverse partitions 17 and 20 and forms a seal therewith. A flat discharge release finger 27 is also connected to the lever 22 by means of a resilient connection 27a. Both wall 26 and finger 27 extend generally in a radial direction from the center of the dispenser 10. The outer end 27b of finger 27 can make contact with housing 19 and in this position will seal a discharge opening between partitions 17 and 20 and housing 19. If the lever 22 is moved in the direction of the arrow as indicated in FIG. 3, the finger 27 will be stopped from further movement toward the left beyond its point of contact with the housing at 19c and will seal the discharge opening. It will be further seen that housing 19 is provided with a cutout area 28 bounded by an end 19a of the housing 19 and by a partition 19b at the other which effectively determines the rotary limits of travel of the lever 22 with respect to the housing 19.

The operation of the dispenser 10 will now be described. When the cover blade 24 is in the position of FIG. 3 and 4, it effectively blocks granular flow from the interior of jar 14 by completely underlying the opening 18 in partition 17. When, however, the lever 22 is rotated from its position of FIG. 3 to the position of FIG. 5, the cover blade 24 gradually uncovers opening 18 to permit flow of the granular material into a gradually increasing pie-shaped chamber 29 which is defined by the housing 19, partitions 17 and 20 and the variable distance between wall 26 and discharge finger 27. In this respect, it will be observed that the finger 27 effects the aforementioned relationship between it and partition 26 because of the stopping effect of housing 19 and the resilient connection 27a.

When the lever 22 is in the position of FIG. 5, it is prevented from further movement by contact with the wall 19b of the housing and the chamber 29 will be filled completely with a predetermined quantity of granular or powdered material. Upon release of the lever 22 as shown in FIG. 6, the spring energy built up in finger 27 will cause counter-rotation of the lever 22 and of wall 26 to discharge material into the cutout or space between ends 19c and 19b of housing 19. Thus, a metered quantity of material, which in the illustrated embodiment is instant coffee, can be readily dispensed into a cup. The amount held in chamber 29 will be that recommended by the manufacturer, for say a cup of light strength. Two dispensed quantities will make a cup of average strength etc. In this way, coffee of uniform and different strengths can be easily brewed on successive occasions.

Of course, lever 22 need not be rotated its total travel between 19a and 19b. If an individual user so desires, lever 22 can be actuated for a fraction, e.g., one-half of its total travel, thus causing lesser amounts to be dispensed from chamber 29.

It will be understood that the foregoing description is related to a particular embodiment of the invention and is, therefore, representative. In order to appreciate fully the scope of the invention, reference should be made to the appended claims.

I claim:

1. A solids metering device for measuring and dispensing particulate material such as instant coffee and the like including a hollow outer housing, transverse partitions connected to said housing, an opening defined by one of said partitions and means for connecting said housing adjacent to said one partition to a container in which there is a quantity of particulate material, a dispensing lever rotatably mounted between said partitions, valve means for sealing the opening in said partition rigidly connected to said lever, a first compartmenting wall rigidly connected to said lever, in sealing relation to each of said partitions, a discharge opening in said housing between said partitions, and a finger spring-mounted to said lever for sealably engaging the edge of said discharge opening.

2. The device of claim 1 wherein said housing is cylindrical, said compartmenting wall and said finger extend generally toward the center of said housing, and said housing defines means for limiting movement of said compartmenting wall with respect to said finger.

3. The device of claim 2 wherein said lever is integrally connected to said valve means which comprises a cover blade underlying said partition opening, said compartmenting wall is integrally connected to said lever, said cover blade extends perpendicularly to said wall and is integral therewith, and said finger is connected integrally to said lever.

4. A solids metering device for receiving and discharging discrete solids material such as instant coffee and the like as a replacement for the closure cap of a jar or similar container filled with said solids comprising, a hollow, cylindrical body having one end threaded for connection to the mouth of a standard-sized jar or container, spaced, transverse partitions connected to said body, a dispensing lever mounted for rotary movement generally about the axis of said body between said partitions, the partition nearest to said threaded end defining an opening communicating with the interior of said jar, a cover blade rigidly connected to said dispensing lever for slidably sealing against said opening in one position of said lever, a compartmenting wall secured to said cover blade perpendicularly at one edge thereof, said wall being rigidly attached to said dispensing lever in sealing relation to said partitions, a flat discharge finger resiliently mounted to said dispensing lever for movement with respect to said lever and the compartmenting wall, said finger being adapted to seal a discharge opening defined between said partitions and said body, said cylindrical body including means for stopping the resilient finger and including means for limiting rotary movement of said lever between positions wherein said blade cover seals the opening in said nearest partition and uncovering positions of said opening, whereby said lever may be rotated to uncover said opening so that solids material can fill a compartment defined between said transverse partitions, the compartmenting wall and said finger, return resilient movement of said finger when said dispensing lever is released causing automatic discharge of said compartment.

* * * * *